United States Patent [19]

Cutler

[11] Patent Number: 4,592,239
[45] Date of Patent: Jun. 3, 1986

[54] FLOWMETER

[75] Inventor: George D. Cutler, Weymouth, United Kingdom

[73] Assignee: Tekflo Limited, Dorset, United Kingdom

[21] Appl. No.: 639,254

[22] Filed: Aug. 9, 1984

[30] Foreign Application Priority Data

Aug. 10, 1983 [GB] United Kingdom ............... 8321482

[51] Int. Cl.⁴ .............................................. G01P 5/16
[52] U.S. Cl. ................................................ 73/861.66
[58] Field of Search ..................... 73/861.62, 861.65

[56] References Cited

U.S. PATENT DOCUMENTS

| 1,119,581 | 12/1914 | Dodge | 73/861.66 |
| 1,250,238 | 12/1917 | Spitzglass | 73/861.66 |
| 3,581,565 | 6/1968 | Dieterich | 73/861.66 |
| 3,782,407 | 1/1974 | Blackwell | 73/861.65 |

Primary Examiner—Donald O. Woodiel
Attorney, Agent, or Firm—McCormick, Paulding & Huber

[57] ABSTRACT

A flowmeter having an elongate probe (2) is insertable into a stream of fluid flowing within a pipe (4) to extend across the stream. The probe (2) includes an internal chamber (10) to extend across the stream, an upstream facing surface (12) against which the said flowing fluid can impinge, and a plurality of impact ports (14) extending through said upstream facing surface to the internal chamber (10). These impact ports (14) are spaced along said upstream facing surface (12) to sense the impact pressure of the fluid at different transverse points across the pipe (4). The impact ports (14) are dimensioned to restrict flow within the chamber (10) so that the pressure within the chamber (10) represents the average impact pressure across the flow profile. A first conduit (18) leads from the chamber (10) to the high pressure port (20) of means for measuring differential pressure, and a second conduit (22) leads from the flow pipe wall downstream of the flowmeter to the low pressure port of the differential pressure measuring device.

3 Claims, 9 Drawing Figures

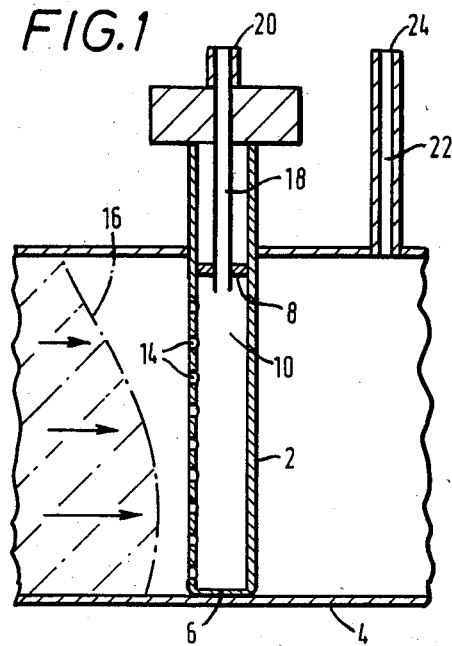
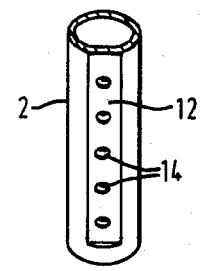
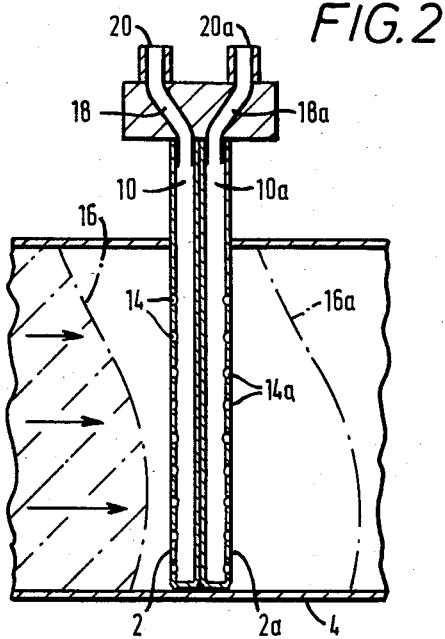
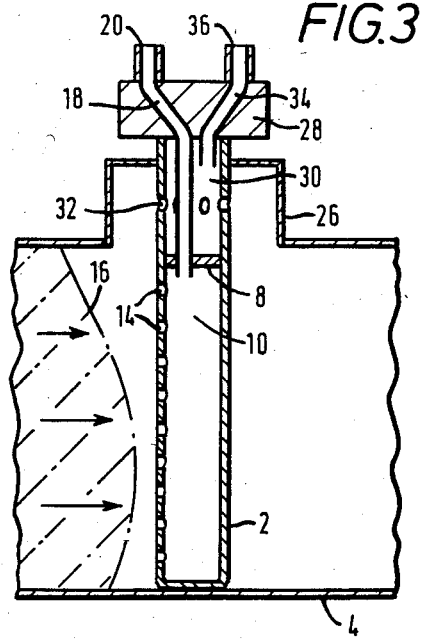

FLOWMETER

TECHNICAL FIELD

The present invention relates to a pitot tube type flowmeter for the measurement of fluid flow within a pipe. The invention is particularly concerned with a flowmeter having an elongate probe insertable into a stream of fluid flowing within a pipe to extend across the stream, said probe including an upstream facing surface against which said flowing fluid can impinge, and a downstream facing surface located downstream of the upstream facing surface. The upstream facing surface contains a port therein to sense the impact pressure of the fluid flow, and the downstream facing surface contains a port therein to sense the downstream suction pressure of the fluid flow. The downstream suction pressure is sometimes referred to as the static pressure. The pressure difference between the impact pressure and the suction pressure is a function of the fluid flow rate in the pipe, and by measuring the impact pressure and the suction pressure in a differential manner it is possible to obtain a measurement of the fluid flow in the pipe.

The problem arises in many cases that the fluid flow rate varies significantly at different transverse points on the pipe cross-section. This means that the obtained value of flow rate will depend on the transverse location in the pipe of the impact pressure and suction pressure ports.

The downstream suction ports may be completely replaced by a single conduit so placed as to measure the pressure at the flow pipe wall, in which case this pressure is virtually background or static pressure.

STATEMENTS OF INVENTION

It is an aim of the invention to alleviate this problem, and according to one aspect of the invention there is provided a flowmeter having an elongate probe insertable into a stream of fluid flowing within a pipe to extend across the stream, said probe including an internal chamber to extend across the stream, an upstream facing surface against which the said flowing fluid can impinge, a plurality of impact ports extending through said upstream facing surface to the internal chamber, said impact ports being spaced along said upstream facing surface to sense the impact pressure of the fluid at different transverse points across the pipe, in which said impact ports are dimensioned to restrict flow within the chamber so that the pressure within the chamber represents the average impact pressure across the flow profile, a first conduit leading from the chamber to the high pressure port of means for measuring differential pressure, and a second conduit leading from the flow pipe wall downstream of the flowmeter, to the low pressure port of the differential pressure measuring device.

The second conduit can be replaced by a downstream facing second probe similar to the aforementioned first probe.

According to another aspect of the invention there is provided a flowmeter which is insertable into a pipe having a hood containing relatively stationary fluid. The flowmeter includes a second chamber therein located in said hood, and one or more transversely and/or radially spaced ports extending into said second chamber to produce in said second chamber an average static pressure. Said first and second conduits extend from said first and second chambers to means for measuring differentially the two pressures.

According to a further aspect of the invention there is provided a flowmeter having an elongate probe insertable into a stream of fluid flowing within a pipe to extend across the stream, said probe including two internal impact chambers locatable on opposite sides of the pipes longitudinal axis, an internal averaging chamber, an upstream facing surface against which the said flowing fluid can impinge, a plurality of impact ports extending through said upstream facing surface into respective ones of said impact chambers, and a first conduit leading from each of said impact chambers to said averaging chamber, in which said impact ports are dimensioned to restrict flow within the impact chambers so that the pressure within the averaging chamber represents the average impact pressure across the flow profile, a second conduit leading from said averaging chamber to means for measuring the average impact pressure, and a third conduit leading from the pipe downstream of the flowmeter to means for measuring the average static pressure of the fluid flow.

The third conduit can be replaced by a downstream facing second flowmeter similar to the aforementioned flowmeter.

According to a further aspect of the invention there is provided a flowmeter which is insertable into a pipe having a hood containing relatively stationary fluid. The flowmeter includes two internal impact chambers locatable on opposite sides of the pipes longitudinal axis, an internal averaging chamber, an upstream facing surface against which the said flowing fluid can impinge, a plurality of impact ports extending through said upstream facing surfaces into respective ones of said impact chambers, and a first conduit leading from each of said impact chambers to said averaging chamber, in which said impact ports are dimensioned to restrict flow within the impact chambers so that the pressure within the averaging chamber represents the average impact pressure across the flow profile, a second conduit leading from said averaging chamber to means for measuring the average impact pressure, a static pressure chamber located in said hood, one or more transversely and/or radially spaced ports extending into said static pressure chamber to produce therein an average static pressure, and a third conduit leading from the static pressure chamber to means for measuring the average static pressure of the fluid flow.

DESCRIPTION OF THE DRAWINGS

Embodiments of the invention will now be described by way of example with reference to the accompanying illustrative drawings in which:

FIGS. 1 to 6, 8 and 9 are diagrammatic side elevations of flowmeters of the invention, and FIG. 7 is a front view of part of the flowmeter of FIG. 1.

DESCRIBED EMBODIMENTS

Figure 4:
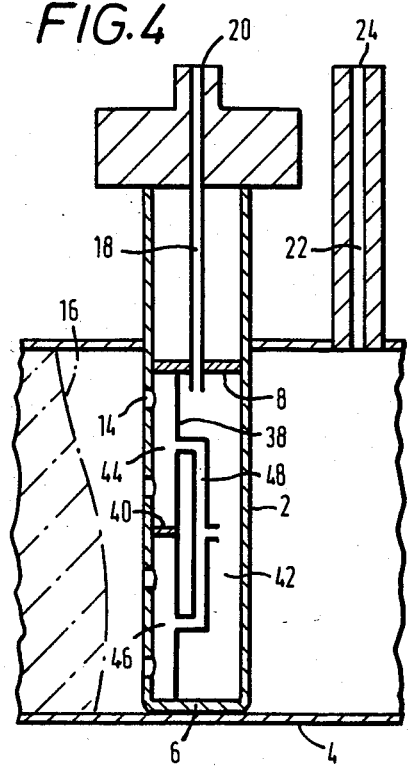

Referring to FIG. 1, a stainless steel tubular probe (2) is mounted in a pipe (4) to extend across the diameter of the pipe (4). The base (6) of the hollow tubular probe (2) and a partition (8) extending across the probe define with the probe wall an internal chamber (10) having a length approximately equal to the diameter of the pipe (4). Referring to FIG. 7, the probe (2) includes a flat upstream facing elongate surface (12), and a series of impact ports (14) extend through this surface (12) to the internal chamber (10). These impact ports (14) are spaced along the surface (12) so as to sense the impact pressure of the pipe fluid at different transverse points across the pipe (4). An important feature of the invention is that these impact ports (14) are dimensioned to restrict flow within the internal chamber (10) so that the pressure within the chamber (10) represents the average impact pressure across the flow profile in the pipe (4). The impact ports (14) are drilled through the upstream facing surface (12), and this surface (12) may be made flat by a suitable milling or filing process.

The function of the flat surface (12) is to form a stopping area for the fluid flow so as to effect an efficient energy transfer and to define a separating area between the upstream impact pressure and the region where the fluid flow tends to slide away around the probe (2). With a probe (2) of 25 mm diameter, the width of the surface (12) may be of 6 to 8 mm. The impact ports (14) may have a diameter from 1 mm to 2 mm, and the thickness of the probe wall may typically be from 3 mm to 5 mm. This combination of dimensions tends to form a high impedance tunnel connecting the internal chamber (10) with the pressure profile (16) formed across the fluid flow of the pipe (4). A communicating tube (18) passes from the interior of the chamber (10) to a measuring port (20) where a measurement may be made of the pressure in the internal chamber (10) with reference to some other pressure described later; this pressure being the average impact pressure of fluid on the series of impact ports (14). A second communicating tube (22) is located downstream from the probe (2), and connects the interior of the pipe (4) to a second measuring port (24) where a measurement is obtained of the nominal static pressure of the fluid in the pipe (4) as measured at the flow pipe wall.

Referring to FIG. 2, another flowmeter of the invention comprises an upstream facing probe and a downstream facing probe with each probe being similar to the probe (2) illustrated in FIG. 1. For clarity the same components will be given the same reference numerals as the probe of FIG. 1, except that the reference numerals of the downstream facing probe will have the suffix "a".

These two probes (2) and (2a) are welded together back to back and suitably machined. In operation, the pressure in the internal chamber (10) is the average impact pressure across the pipe pressure profile (16), and the pressure in the internal chamber (10a) is the average suction pressure across the pipe pressure profile (16a). These two pressures are measured at the measuring ports (20) and (20a) respectively using a differential pressure meter.

Referring to FIG. 3, a further flowmeter of the invention will now be described, and for clarity components will be given the same reference numerals as in the sub-flowmeter illustrated in FIG. 1. Referring to FIG. 3, the flowmeter includes an elongate tubular probe (2) which is insertable in a pipe (4) having a hood 26 which contains relatively stationary fluid. The partition (8) and an upper manifold (28) define a second chamber (30) which is located in said hood (26). Six ports (32) are drilled radially through the probe (2) to extend into the second chamber (30). These ports (32) are located around the circumference of the probe (2) and are from 1 mm to 2 mm in diameter. A communicating tube (34) extends from the second chamber (30) to a measuring port (36) where a measurement can be obtained for the pressure in the second chamber (30). The dimensions of the ports (32) are arranged to form a high impedance tunnel between the inside of the second chamber (30) and the pressure variation within the volume enclosed by the hood (26). This dimensioning of the ports (32) ensures that the pressure in the second chamber (30) is an average of the pressure within the hood (26) and is virtually "true static pressure". The remainder of the probe (2) is similar to the probe illustrated in FIG. 1, and a measurement is obtained at the measuring port (20) of the average impact pressure across the pipe (4) which when measured differentially in conjunction with the pressure at port (36) give a measure of average flow in the flow pipe.

Figure 5:
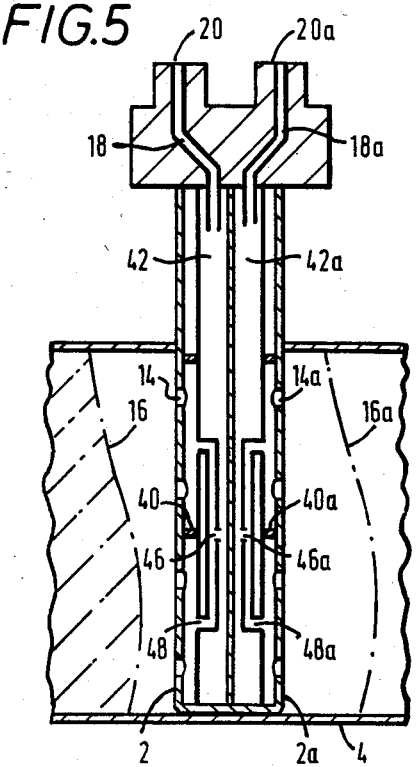
Figure 6:
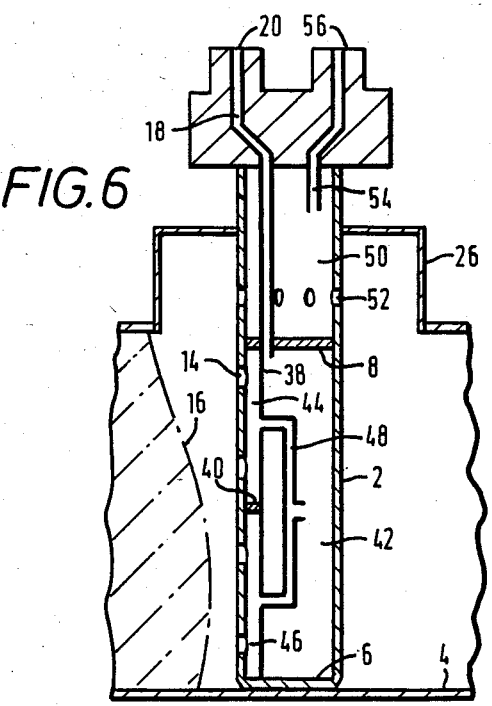

FIGS. 4, 5 and 6 are diagrammatic side views of further flowmeters of the invention, and for clarity corresponding components will be given the same reference numerals.

Referring to FIG. 4, a further flowmeter includes a stainless steel tubular probe (2) located in a pipe (4) to extend along a diameter of the pipe. A probe base (6) and a partition (8) in the probe (2) are located adjacent to opposite portions of the pipe wall. Longitudinal and lateral partitions (38) and (4) are located in the probe (2) to define the base (6) and partition (8) an averaging chamber (42) and an impact chamber divided into upper and lower portions (44) and (46). Four impact ports (14) extend through the upstream facing portion of the probe (2) into the impact chamber. These impact ports (14) are spaced between the base (6) and the partition (8) so that two impact ports extend into the impact chamber upper portion (44) and the othr two impact ports extend into the impact chamber lower portion (46). A junction tube (48) has its two outer arms entering one each of the impact chamber portions (44) and (46) and its central arm entering the averaging chamber (42). A communicating tube (18) connects the averaging chamber (42) to a measuring port (20). A second communicating tube (22) extends radially outwards from the pipe (4) downstream of the probe (2) to a measuring port (24). The probe (2) is located in the pipe (4) so that the partition (40) is at or near to the longitudinal axis of the pipe (4). This means that the impact chamber upper and lower portions (44) and (46) sense the upper and lower parts respectively of the pressure profile (16) of the pipe fluid. The pressure sensed in the chamber upper portion (44) is approximately the average impact pressure of the upper part of the pressure profile (16), and the pressure sensed in the chamber lower portion (46) is approximately the average impact pressure of the lower part of the pressure profile (16); any difference in these two average pressures causes a flow in the junction tube (48) such that the pressure in the averaging chamber (42) will be the average of the two average impact pressures in the chamber portions (44) and (46). It is preferable that the two halves of the junction tube (48) be of substantially equal length and diameter to ensure that the exit pressure of the junction tube (48) into the averaging chamber (42) is in fact the average of the pressures in the two chamber portions (44) and (46).

The communicating tube (18) transmits the pressure from the avering chamber (42) to the measuring port (20) where a measurement of this average impact pressure is obtained. The second communicating tube (22) senses the wall pressure of the pipe (4) which is substantially the static or background pressure, and transmits this static pressure to the measuring port (24) where a measurement is obtained. The difference between the obtained measurements of the average impact pressure and static pressure enables a measurement to be obtained of the fluid flow in the pipe (4).

The second communicating tube (22) with a port (24) can be replaced by a single downstream facing sensing port passing through the chamber (42). This port may be centrally located but preferably is located in proximity to the wall of the pipe (4). This replacement of the second communicting tube (22) by the downstream facing port through the chamber wall can also be applied to the construction of FIG. 1.

FIG. 5 illustrates a flowmeter which is essentially two probes (2) of FIG. 4 placed back to back to face upstream and downstream respectively. For clarity the same components will have the same reference numerals as the probe of FIG. 4, and the numerals of the downstream facing probe will have the suffix "a". The upstream facing probe obtains an average value of the impact pressure which is measured at the measuring port (20) and the downstream facing probe obtains an average value of the suction pressure which is measured at the measuring port (20a).

FIG. 6 illustrates a flowmeter including a probe (2) which is inserted into a pipe (4) having a hood (26). For clarity corresponding components will be given the same reference numerals as the components of FIG. 4. The probe (2) has all the features of the probe (2) illustrated in FIG. 4. However, this probe (2) also includes a second chamber (50) located substantially in the lay-by hood which contains relatively stationary fluid. Six static ports (52) extend radially through the probe (2) into the second chamber (50). These ports are spaced around the circumference of the second chamber (50) to provide in the second chamber (50) an average value of the static pressure of the fluid in the hood (26). A second communicating tube (54) connects the second chamber (50) to a measuring port (56) where a measurement of the average static pressure in the second chamber (50) can be obtained. Any desired number of static ports (52) including a single port, can be used.

The factors controlling the dimensions of the impact ports (14) in the flowmeters of FIGS. 4 to 6 are the same as those in the flowmeters of FIGS. 1 to 3.

All pressures relevant to the measurement of flow are measured differentially so as to eliminate the effect of the pumping pressure within the flow pipe.

It is to be emphasised that the term "fluid" in this specification is used in its broadest sense and includes gases, liquids or bi-phase fluids.

Two or more of the aforementioned flowmeters of the invention may be located co-linearly in the same housing. The average pressure profile of each flowmeter is taken to a furthr averaging chamber to provide an average reading of each average pressure. This principle can be applied to any number of flowmeters.

There will now be described flowmeters which are particularly suitable for use with flow pipes having a diameter greater than 90 cms or flow pipes of non-circular cross-section such as for example rectangular, square or oval cross-section in which the pressure profile is likely to be assemetrical.

Referring to FIG. (8) a tubular probe (58) is mounted in a pipe (60) to extend across the diameter of the pipe. This probe (58) is divided into two chambers (62) and (64) by a partition (66) which is located on the diameter of the pipe (60). Each probe chamber (62) and (64) is substantially the same as the probe (2) illustrated in FIG. 1. Four impact ports (68) extend through the upstream facing the surface (70) of each probe chamber (62) and (64). This upstream surface (70) and the impact ports (68) are substantially the same as the surface (12) and impact ports (14) in the probe (2) of FIG. 1. In consequence the pressure in the upper chamber (62) represents the average impact pressure across the flow profile in the upper half of the pipe (60) and the pressure in the lower chamber (64) represents the average impact pressure across the flow profile in the lower half of the pipe (60). These chambers (62) and (64) communicate with an averaging chamber (not shown) inside the probe (58). Any difference in the pressures in the chambers (62) and (64) is communicated to the averaging chamber so that the pressure in the averaging chamber will be the average of the two average impact pressures in the chambers (62) and (64). A communicating tube passes from the center of the averaging chamber to a measuring port where a measurement may be made of the pressure in this averaging chamber; this pressure being the average impact pressure of fluid on the four impact ports (68). A measurement may be obtained of the nominal static pressure of the fluid in the pipe (60) using a comunicating tube similar to the communicating tube (22) illustrated in FIG. 1.

The probe (58) has a diameter of approximately 5.80 cms thereby providing sufficient space for the aforementioned chambers.

Figure 8:
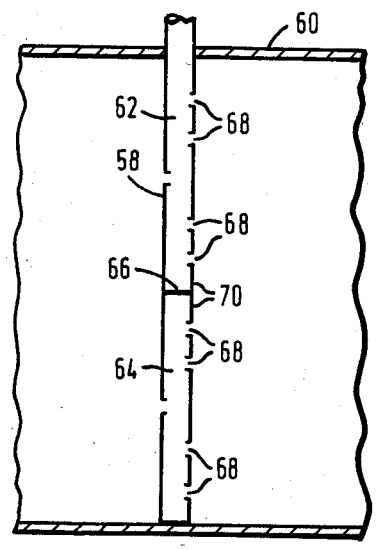

Although the flow meter of FIG. 8 has been described with reference to FIG. 1, it is to be understood that this flow meter of FIG. 8 is equally applicable to all the configurations illustrated in FIGS. 1 to 7.

Figure 9:
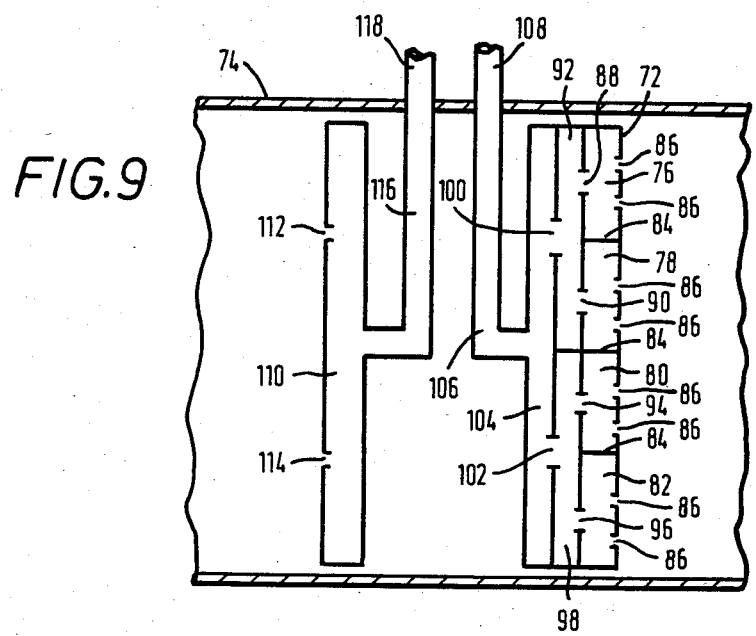

FIG. 9 illustrates a further flow meter which is in principle a combination of two of the flow meters illustrated in FIG. 4. A tubular probe (72) is located in the pipe (74) to extend across the pipe diameter. The probe (72) is divided into four primary sensing chambers (76), (78), (80) and (82) by means for partitions (84). The central partition (84) is located on the diameter of the pipe (74). Eight impact ports (86) extend through the upstream facing portion of the probe (72) with two impact ports (86) in each of the chambers (76) to (82).

The primary sensing chambers (76) to (82) sense four radially spaced portions of the pressure profile of the pipe fluid. The pressure sensed in each of the chambers (76) to (82) is approximately the average impact pressure in that respective pipe portion. Any difference in the pressures in the sensing chambers (76) and (78) causes a flow through ports (88) and (90) so that the pressure in a primary averaging chamber (92) is the average of the two average impact pressures in the sensing chambers (76) and (78). Similarly, any difference in the pressures in the sensing chambers (80) and (82) causes a flow through ports (94) and (96) such that the pressure in a primary averaging chamber (98) is the average of the two average impact pressures in primary sensing chambers (80) and (82). Any difference in the pressures in the primary averaging chambers (92) and (98) cause a flow through ports (100) and (102) so that the pressure in a secondry averaging chamber (104) will be the average impact pressure across the pipe (74). A communicating tube (106) transmits the pressure from the secondry averaging chamber (104) to a measuring port (108) where a measurement of this average impact pressure is obtained.

A second probe (110) extends across the pipe (74) down stream of the probe (72). Two ports (112) and (114) are located in the downstream facing surface of the probe (110), and are equally spaced from the diameter of the pipe (74). These ports (112) and (114) are similar to the ports illustrated in FIG. 1 so that the pressure within the probe (110) represents the average static pressure in the pipe (74). A communicating tube (116) transmits this average static pressure to a measuring port (118) where a measurement is obtained. Similarly to the embodiments illustrated in FIGS. 1 to 7, the probe (110) could if desired be in the image of the probe (72).

It would be appreciated that the flow meters illustrated in FIGS. 8 and 9 are particularly suitable for use with pipes having a diameter is excess of 90 cm because these flow meters are equipped to provide an average value of the fluid flow profile. The probes illustrated in FIGS. 8 to 9 can be used with suitably arranged hydraulic or pneumatic circuits as required by the operator.

If desired, two or more of the flow meters illustrated in FIGS. 8 and 9 can be located across parallel diameter lines in a rectangular pipe of duct. Other probes can be located at angles such as 90° to the aforementioned probes depending upon the type of flow profile to be metered. A similar configuration of flow meters can be used with pipes of circular, oval or irregular shape.

I claim:

1. A flowmeter comprising an elongate upstream facing probe insertable across a stream of fluid, said probe defining longitudinally spaced impact ports disposed along the probes length, said probe defining at least two internal impact chambers, some of said impact ports communicating with one impact chamber and other impact ports with a said second impact chamber, an internal averaging impact pressure chamber, a first conduit leading from said one impact chamber to said averaging impact chamber, a second conduit leading from said second impact chamber to said averaging impact chamber, said impact ports so dimensioned as to restrict the flow within said impact chambers so that the pressure within the averaging impact chamber represents the average impact pressure across the flow profile, means for measuring the average impact pressure in said averaging impact chamber, a downstream facing probe having static ports disposed along the length of said probe, said static probe defining at least two internal static chambers, some static ports communicating with one static chamber and other static ports communicating with said second static chamber, an internal averaging static pressure chamber, a first static conduit leading from said one static chamber to said averaging static chamber, a second static conduit leading from said second static chamber to said averaging static chamber, and means for measuring the average static pressure.

2. The flowmeter according to claim 1 further characterized by a secondary impact pressure averaging chamber communicating with said averaging impact chamber, and wherein said at least two internal impact chambers comprise at least four internal impact chambers each of which communicates with at least two impact ports all of which impact ports are spaced across the width of the fluid flow.

3. The flowmeter according to claim 2 wherein said downstream facing second probe defines a number of static ports corresponding to the number of impact ports in said first mentioned probe, and wherein a secondary averaging static chamber is provided in communication with at least two of said averaging static chambers so that the pressure within said secondary static chamber represents the average static pressure across the flow profile.

* * * * *